United States Patent
Takemoto et al.

(10) Patent No.: US 11,938,565 B2
(45) Date of Patent: Mar. 26, 2024

(54) LASER WELDING DEVICE

(71) Applicant: AISIN FUKUI CORPORATION, Echizen (JP)

(72) Inventors: Kouji Takemoto, Echizen (JP); Kazuyoshi Miyamoto, Echizen (JP); Tomoaki Yoshida, Echizen (JP); Daichi Sumimori, Kani (JP); Hiroshi Hasegawa, Kani (JP)

(73) Assignee: AISIN FUKUI CORPORATION, Fukui (JP)

(*) Notice: Subject to any disclaimer, the term of this patent is extended or adjusted under 35 U.S.C. 154(b) by 255 days.

(21) Appl. No.: 17/299,385

(22) PCT Filed: Dec. 4, 2019

(86) PCT No.: PCT/JP2019/047434
§ 371 (c)(1),
(2) Date: Jun. 3, 2021

(87) PCT Pub. No.: WO2020/116515
PCT Pub. Date: Jun. 11, 2020

(65) Prior Publication Data
US 2022/0055151 A1 Feb. 24, 2022

(30) Foreign Application Priority Data
Dec. 4, 2018 (JP) .................... 2018-227491

(51) Int. Cl.
*B23K 26/142* (2014.01)
*B23K 26/12* (2014.01)
(Continued)

(52) U.S. Cl.
CPC .......... *B23K 26/142* (2015.10); *B23K 26/123* (2013.01); *B23K 26/127* (2013.01);
(Continued)

(58) Field of Classification Search
CPC .... B23K 26/21; B23K 26/064; B23K 26/147; B23K 26/127; B23K 26/123; B23K 26/142
(Continued)

(56) References Cited

U.S. PATENT DOCUMENTS 3,817,733 A * 6/1974 Thuler .................... C03B 23/18
65/153
3,969,603 A * 7/1976 Boughton ................ H05H 1/42
219/121.45
(Continued)

FOREIGN PATENT DOCUMENTS

CN 107745182 A 3/2018
JP S57-000537 A 1/1982
(Continued)

OTHER PUBLICATIONS

Office Action (The First Office Action) dated Jul. 28, 2022, by the State Intellectual Property Office of People's Republic of China in corresponding Chinese Patent Application No. 201980080747.3 and an English Translation of the Office Action. (15 pages).

(Continued)

Primary Examiner — Jimmy Chou
(74) Attorney, Agent, or Firm — BUCHANAN INGERSOLL & ROONEY PC

(57) ABSTRACT

The laser welding device includes a laser transmission window and a gas injection nozzle. The gas injection nozzle includes an optical path hole and an injection unit that injects an inert gas for shielding metal vapor into the optical path hole toward an irradiation direction side and an optical axis side of a laser beam.

12 Claims, 10 Drawing Sheets

(51) Int. Cl.
*B23K 26/14* (2014.01)
*B23K 26/064* (2014.01)
*B23K 26/21* (2014.01)

(52) U.S. Cl.
CPC .......... *B23K 26/147* (2013.01); *B23K 26/064* (2015.10); *B23K 26/21* (2015.10)

(58) Field of Classification Search
USPC .......................................................... 219/74
See application file for complete search history.

(56) References Cited

U.S. PATENT DOCUMENTS

| | | | | | |
|---|---|---|---|---|---|
| 4,021,898 | A | * | 5/1977 | Willis | H03H 3/04 29/25.35 |
| 4,278,867 | A | * | 7/1981 | Tan | B23K 26/123 219/121.64 |
| 4,354,088 | A | * | 10/1982 | Rehrig | B23K 9/291 219/121.48 |
| 4,417,948 | A | * | 11/1983 | Mayne-Banton | B29C 59/16 219/121.85 |
| 4,609,566 | A | * | 9/1986 | Hongo | G03F 1/72 118/725 |
| 4,689,467 | A | * | 8/1987 | Inoue | B23K 26/0665 219/121.84 |
| 4,979,181 | A | * | 12/1990 | Nakanose | B23K 26/123 372/98 |
| 5,660,744 | A | * | 8/1997 | Sekine | H01J 37/3266 204/298.37 |
| 5,669,979 | A | * | 9/1997 | Elliott | H01L 21/02052 134/1 |
| 5,788,034 | A | * | 8/1998 | Maruki | F16H 45/02 219/121.16 |
| 7,514,015 | B2 | * | 4/2009 | Elliott | H01L 21/67005 216/60 |
| 8,721,772 | B2 | * | 5/2014 | Lee | B01D 46/42 55/385.2 |
| 9,061,304 | B2 | * | 6/2015 | Miller | B23K 26/36 |
| 9,919,372 | B2 | * | 3/2018 | Matsuda | B23K 3/04 |
| 2003/0038122 | A1 | * | 2/2003 | Yamazaki | H01L 21/02532 219/121.76 |
| 2003/0106881 | A1 | * | 6/2003 | Lee | H01J 37/32082 219/121.68 |
| 2008/0003081 | A1 | * | 1/2008 | Kasumi | H01L 21/67748 414/217 |
| 2008/0067160 | A1 | * | 3/2008 | Suutarinen | B23K 26/1224 219/121.67 |
| 2010/0108648 | A1 | * | 5/2010 | Koseki | B23K 26/12 219/121.84 |
| 2010/0187209 | A1 | * | 7/2010 | Miyazaki | B23K 26/38 219/121.84 |
| 2011/0174790 | A1 | * | 7/2011 | Suzuki | H01L 21/67115 219/121.84 |
| 2012/0094839 | A1 | * | 4/2012 | Khare | B23K 26/147 505/480 |
| 2012/0225568 | A1 | * | 9/2012 | Izawa | H01L 21/02126 257/E21.328 |
| 2013/0213945 | A1 | * | 8/2013 | Stegmann | G01N 23/04 219/121.83 |
| 2013/0341313 | A1 | * | 12/2013 | Himmelsbach | B23K 26/70 219/121.86 |
| 2015/0201469 | A1 | * | 7/2015 | Shimomura | H05B 6/6411 219/754 |
| 2015/0228528 | A1 | * | 8/2015 | Behdjat | H01L 21/6875 219/444.1 |
| 2017/0162416 | A1 | * | 6/2017 | Miyazawa | H01J 37/32715 |
| 2021/0078104 | A1 | * | 3/2021 | Määttänen | B23K 26/1224 |
| 2022/0023970 | A1 | | 1/2022 | Takemoto et al. | |
| 2022/0055150 | A1 | | 2/2022 | Takemoto et al. | |

FOREIGN PATENT DOCUMENTS

| | | | |
|---|---|---|---|
| JP | S62107891 A | | 5/1987 |
| JP | H02290687 A | | 11/1990 |
| JP | 5234471 B2 | | 7/2013 |
| JP | 2016120506 A | * | 7/2016 |
| JP | 2016120506 A | | 7/2016 |
| JP | 2017131904 A | | 8/2017 |
| WO | 2011145514 A1 | | 11/2011 |

OTHER PUBLICATIONS

Office Action (The First Office Action) dated Aug. 29, 2022, by the State Intellectual Property Office of People's Republic of China in Chinese Patent Application No. 201980080778.9 and an English Translation of the Office Action. (11 pages).

Office Action (Notice of Reasons for Refusal) dated Oct. 11, 2022, by the Japan Patent Office in Japanese Patent Application No. 2018-227489 and an English translation of the Office Action. (6 pages).

Office Action (Notice of Reasons for Refusal) dated Oct. 11, 2022, by the Japan Patent Office in corresponding Japanese Patent Application No. 2018-227491 and an English translation of the Office Action. (7 pages).

U.S. Appl. No. 17/299,500, filed Jun. 3, 2021, Kouji Takemoto et al.
U.S. Appl. No. 17/299,414, filed Jun. 3, 2021, Kouji Takemoto et al.
International Search Report (PCT/ISA/210) with translation and Written Opinion (PCT/ISA/237) dated Feb. 18, 2020, by the Japanese Patent Office as the International Searching Authority for International Application No. PCT/JP2019/047434. (9 pages).

* cited by examiner

LASER WELDING DEVICE

TECHNICAL FIELD

The present invention relates to a laser welding device, and more particularly to a laser welding device including a chamber having a low-pressure internal space in which a workpiece is disposed and a laser beam irradiation unit that irradiates the workpiece with a laser beam to weld the workpiece.

BACKGROUND ART

In the related art, a laser welding device is known, which includes a chamber having a low-pressure internal space in which a workpiece is disposed and a laser beam irradiation unit that irradiates the workpiece with a laser beam to weld the workpiece. For example, a laser welding device is disclosed in Japanese Patent No. 5234471.

Japanese Patent No. 5234471 discloses a laser welding device, which includes a chamber in which a workpiece disposed inside is welded in a low vacuum atmosphere and a laser unit (laser beam irradiation unit) that irradiates the workpiece with a laser beam to weld the workpiece. The laser welding device of Japanese Patent No. 5234471 includes a shield gas pipe disposed between the laser unit and the chamber. The shield gas pipe has a shield gas introduction hole through which a shield gas (inert gas) is introduced into the shield gas pipe and a transmission window (laser transmission window) disposed on an incident side of the shield gas pipe in an optical axis direction.

In the laser welding device of Japanese Patent No. 5234471, the shield gas flows into the shield gas pipe in the optical axis direction from the shield gas introduction hole, and the workpiece is irradiated with the laser beam from the laser unit. Then, in the laser welding device of Japanese Patent No. 5234471, the workpiece is melted by the laser beam with which the workpiece is irradiated, and thus, the workpiece is welded.

CITATION LIST

Patent Literature

[PTL 1] Japanese Patent No. 5234471

SUMMARY OF INVENTION

Technical Problem

Here, in the laser welding device of Japanese Patent No. 5234471, the inside of the chamber has a low vacuum atmosphere. Accordingly, metal vapor ejected from the workpiece melted by the laser beam passes through the shield gas pipe and heads toward the transmission window. In this case, in the laser welding device of Japanese Patent No. 5234471, by the shield gas flowing in the optical axis direction from the shield gas introduction hole, it is possible to prevent the metal vapor ejected from the workpiece from reaching the transmission window and adhering to the transmission window.

However, in the laser welding device of Japanese Patent No. 5234471, by further weakening a force of the metal vapor ejected from the workpiece to make shielding property with respect to the metal vapor more stable, it is desired to more reliably prevent the metal vapor ejected from the workpiece from reaching the transmission window (laser transmission window) and adhering to the transmission window.

The present invention is made to solve the above problems, and one object of the present invention is to provide a laser welding device capable of more effectively preventing metal vapor from adhering to a laser transmission window when a workpiece is weld.

Solution to Problem

As a result of diligent studies by the inventor of the present application in order to achieve the above object, a new finding has been obtained that by injecting an inert gas to metal vapor ejected from a workpiece toward an irradiation direction side and the optical axis side of a laser beam, it is possible to further weaken a force of the metal vapor ejected from the workpiece and more effectively prevent the metal vapor from adhering to the transmission window when the workpiece is melted. A laser welding device according to one aspect of the present invention utilizes this new finding to prevent the metal vapor from adhering to the laser transmission window when welding the workpiece. That is, according to an aspect of the present invention, there is provided a laser welding device including: a chamber that has a low-pressure internal space in which a workpiece is disposed; a laser beam irradiation unit that irradiates the workpiece with a laser beam to weld the workpiece; a laser transmission window through which the laser beam from the laser beam irradiation unit is transmitted; and a gas injection nozzle that is disposed on a workpiece side from the laser transmission window, in which the gas injection nozzle includes an optical path hole through which the laser beam passes and an injection unit that injects an inert gas for shielding metal vapor, which is ejected from the workpiece to the laser transmission window side when the workpiece is welded by the laser beam, into the optical path hole toward an irradiation direction side and an optical axis side of the laser beam.

In the laser welding device according to one aspect of the present invention, as described above, there is provided the gas injection nozzle which includes the optical path hole through which the laser beam passes, and the injection unit that injects the inert gas for shielding metal vapor, which is ejected from the workpiece to the laser transmission window side when the workpiece is welded by the laser beam, into the optical path hole toward the irradiation direction side and the optical axis side of the laser beam. As a result, when the workpiece is welded, by applying an inert gas injected from the injection unit toward the irradiation direction side and the optical axis side of the laser beam to the metal vapor directed from the workpiece to the laser transmission window, unlike when only filling with the inert gas, the force of the metal vapor ejected from the workpiece can be weakened and pushed back, and thus, the metal vapor from the workpiece toward the laser transmission window can be effectively prevented. Further, as compared with a case where the inert gas is injected in a direction substantially perpendicular to the optical axis of the laser beam, it is possible to increase a force for pushing back the metal vapor from the workpiece toward the laser transmission window. As a result, it is possible to effectively prevent the metal vapor from adhering to the laser transmission window when the workpiece is welded. Further, by causing the laser beam to pass through the optical path hole, it is possible to prevent the metal vapor from adhering to the laser transmission window when the workpiece is welded without interfering with the irradiation of the laser beam.

In the laser welding device according to the above one aspect, preferably, the injection unit is configured to inject the inert gas in a direction inclined at a predetermined angle with respect to an optical axis of the laser beam toward the irradiation direction side and the optical axis side of the laser beam. According to this configuration, unlike injecting an inert gas in a direction substantially parallel to the optical axis of the laser beam, a gas shield covering the optical path hole can be formed more reliably. As a result, the metal vapor from the workpiece toward the laser transmission window can be effectively prevented, and thus, it is possible to more effectively prevent the metal vapor from adhering to the laser transmission window when the workpiece is welded.

In the laser welding device according to the above one aspect, preferably, the injection unit is provided in a circumferential shape along an inner peripheral surface of the optical path hole. According to this configuration, the inert gas can be injected from the injection unit into the optical path hole in a well-balanced manner (uniformly), and thus, a uniform gas shield can be formed in the optical path hole. As a result, shielding property of the inert gas with respect to the metal vapor can be stabilized.

In a laser welding device including the injection unit provided in a circumferential shape along the inner peripheral surface of the optical path hole, preferably, the injection unit is formed in a circumferential slit shape. According to this configuration, unlike a case where the injection unit is provided by forming a plurality of holes, the inert gas can be injected from the injection unit into the optical path hole without any gap, and a more uniform gas shield can be formed in the optical path hole. As a result, the shielding property of the inert gas with respect to the metal vapor can be further stabilized.

In this case, preferably, the injection unit having a slit shape is inclined at an angle substantially the same as the predetermined angle as a whole. According to this configuration, unlike a case where only a tip portion of the injection unit is inclined at substantially the same angle as the predetermined angle and the inert gas is injected in a direction inclined by the predetermined angle, it is possible to prevent a pressure loss from increasing. That is, since the inert gas passing through the injection unit can smoothly flow, it is possible to prevent a flow velocity of the inert gas injected from the injection unit from decreasing. As a result, it is possible to prevent the force of the inert gas injected from the injection unit from being weakened, and thus, the metal vapor from the workpiece toward the laser transmission window can be more effectively prevented.

In the laser welding device including the injection unit provided in a circumferential shape along the inner peripheral surface of the optical path hole, preferably, an inert gas introduction unit that introduces the inert gas into the gas injection nozzle is further provided, and the gas injection nozzle further includes a buffer space which is provided in a circumferential shape on an outside of the circumferential injection unit and through which the inert gas introduced from the inert gas introduction unit flows. According to this configuration, the circumferential buffer space can stabilize a flow rate of the inert gas injected from the injection unit, and thus, a more uniform gas shield can be formed in the optical path hole.

In the laser welding device including the buffer space, preferably, a plurality of the inert gas introduction units are disposed on an outer peripheral portion of the gas injection nozzle at substantially equal angular intervals. According to this configuration, an amount of the inert gas flowing in the buffer space can be stabilized, and thus, a more uniform gas shield can be formed in the optical path hole.

In the laser welding device according to the above one aspect, preferably, the optical path hole has a constant cross-sectional shape that is orthogonal to the irradiation direction along the irradiation direction, as a whole. According to this configuration, unlike a case where the optical path hole does not have a constant cross-sectional shape orthogonal to the irradiation direction along the irradiation direction, a change in the flow velocity of the inert gas injected into the optical path hole can be suppressed. Further, unlike a case where the flow velocity of the inert gas injected into the optical path hole becomes high, the flow of the inert gas in the optical path hole is less likely to become turbulent, and thus, a more uniform gas shield can be formed in the optical path hole. As a result, the shielding property of the inert gas with respect to the metal vapor ejected from the workpiece toward the laser transmission window can be stabilized.

In the laser welding device according to the above one aspect, preferably, a cross-sectional shape of the optical path hole orthogonal to the irradiation direction has a circular shape equal to or larger than a spot diameter of the laser beam at a disposition position of the gas injection nozzle and smaller than a diameter of the laser transmission window. According to this configuration, it is possible to prevent the metal vapor ejected from the workpiece toward the laser transmission window from passing through the optical path hole while allowing the laser beam to pass through the optical path hole, and thus, it is possible to more effectively prevent the metal vapor from adhering to the laser transmission window when the workpiece is welded.

In the laser welding device according to the above one aspect, preferably, a tubular portion through which the laser beam that has been transmitted through the laser transmission window passes and which communicates with the chamber is further provided, and the laser transmission window and the gas injection nozzle are disposed in the tubular portion. According to this configuration, the gas injection nozzle can be disposed in a tubular portion having an internal dimension that allows the laser beam to pass through. Therefore, as compared with a case where the gas injection nozzle is disposed in a chamber having a relatively large volume in which the workpiece is disposed, it is possible to prevent a size of the gas injection nozzle from increasing.

In the laser welding device including the above-mentioned tubular portion, preferably, the tubular portion has a first tubular portion in which the laser transmission window is disposed and a second tubular portion which has a space through which the laser beam passes and is adjacent to the irradiation direction side of the first tubular portion, a length of the second tubular portion in the irradiation direction is longer than a length of the first tubular portion in the irradiation direction, and the gas injection nozzle is disposed on the chamber side of the first tubular portion from the laser transmission window. According to this configuration, the inert gas can be diffused in the second tubular portion, and the inert gas injected by the gas injection nozzle can block the metal vapor. Therefore, it is possible to more reliably prevent the metal vapor from adhering to the laser transmission window when the workpiece is welded.

In this case, a pump which exhausts air in the chamber to form a low pressure in the internal space of the chamber is further provided, the chamber includes an exhaust port connected to the pump, and a distance from the gas injection nozzle to the exhaust port is longer than a distance from the gas injection nozzle to the laser transmission window. According to this configuration, it is possible to prevent the inert gas injected from the injection unit from being disturbed due to a negative pressure generated by gas exhausted by the vacuum pump. As a result, it is possible to suppress a decrease in the shielding property of the gas shield formed by the inert gas injected from the injection unit.

Advantageous Effects of Invention

According to the present invention, as described above, it is possible to effectively prevent metal vapor from adhering to a laser transmission window when a workpiece is welded.

DESCRIPTION OF EMBODIMENTS

Hereinafter, embodiments of the present invention will be described.

First Embodiment

First, a configuration of a laser welding device 1 according to a first embodiment of the present invention will be described with reference to FIGS. 1 to 5.

(Laser Welding Device)

Figure 1:
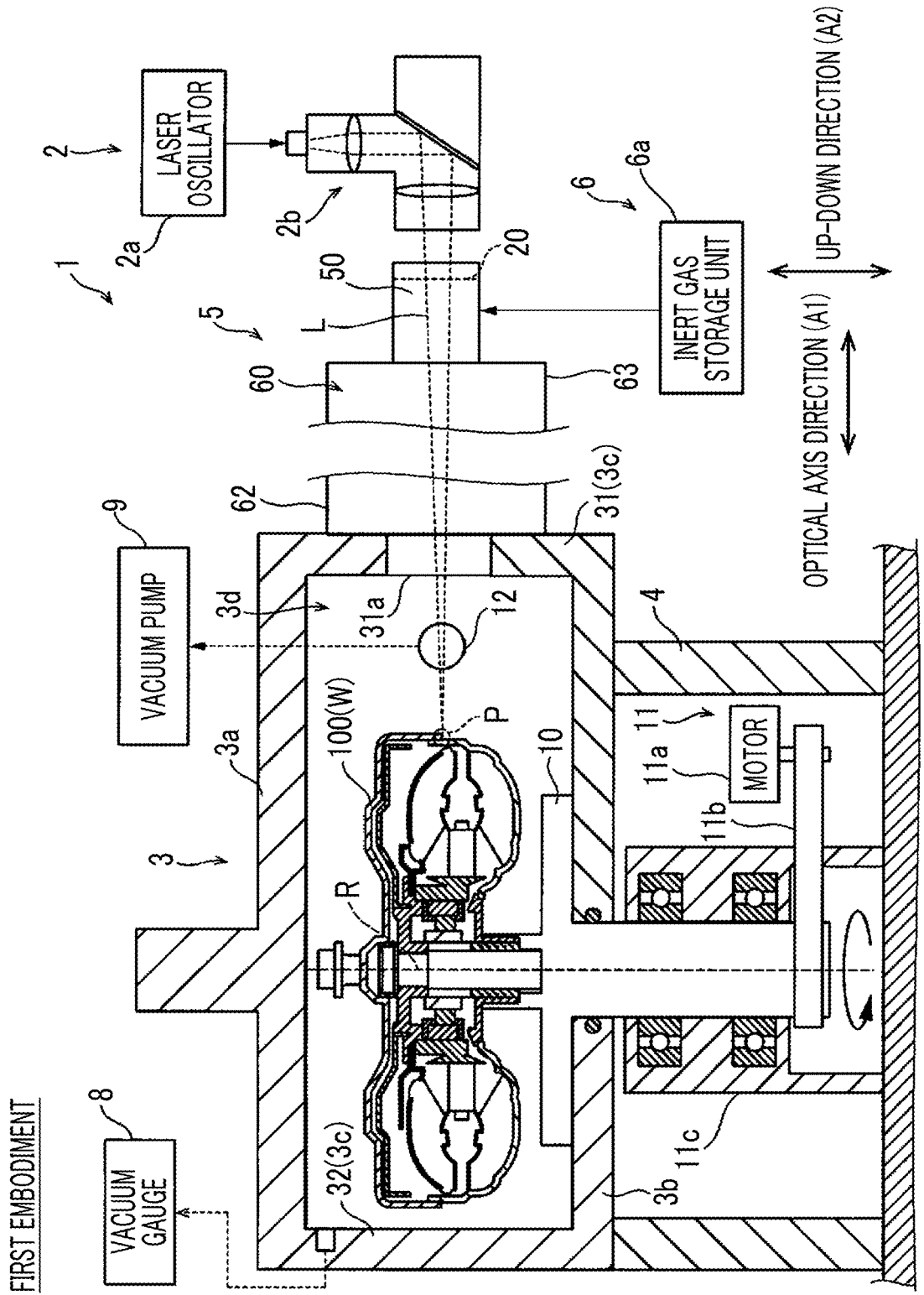
FIG. 1 is a schematic cross-sectional view illustrating the entire laser welding device according to a first embodiment.

As illustrated in FIG. 1, the laser welding device 1 is configured to perform welding, by a laser beam L, on a torque converter 100 (hereinafter, workpiece W) that transmits rotational torque from an engine to a shaft of a transmission. Specifically, the laser welding device 1 includes a laser beam irradiation unit 2, a chamber 3, a leg portion 4, a tubular portion 5, an inert gas supply unit 6, a shutter 7 (refer to FIG. 2), a vacuum gauge 8, a vacuum pump 9, a support portion 10, and a rotation drive mechanism 11. The vacuum pump 9 is an example of a "pump" in claims.

The laser beam irradiation unit 2 is configured to irradiate the workpiece W with the laser beam L to weld the workpiece W. Here, the laser beam irradiation unit 2 uses known laser such as a $CO_2$ laser, a Yttrium aluminum garnet (YAG) laser, a fiber laser, or a disk laser. Specifically, the laser beam irradiation unit 2 includes a laser oscillator 2a that generates the laser beam L and an optical system 2b that adjusts a focus of the laser beam L generated by the laser oscillator 2a. Further, the laser beam irradiation unit 2 has a long focal length (focal length F: about 900 [mm]). In the workpiece W, a point to which the laser beam L from the laser beam irradiation unit 2 is applied is defined as a processing point P.

Here, a direction in which an optical axis A of the laser beam L emitted from the optical system 2b in the laser beam irradiation unit 2 extends is defined as an optical axis direction A1. Further, a direction orthogonal to the optical axis direction A1 and an up-down direction A2 is defined as a width direction A3. Further, a direction in which the laser beam L emitted from the optical system 2b in the laser beam irradiation unit 2 toward the workpiece W is defined as an irradiation direction E.

Figure 2:
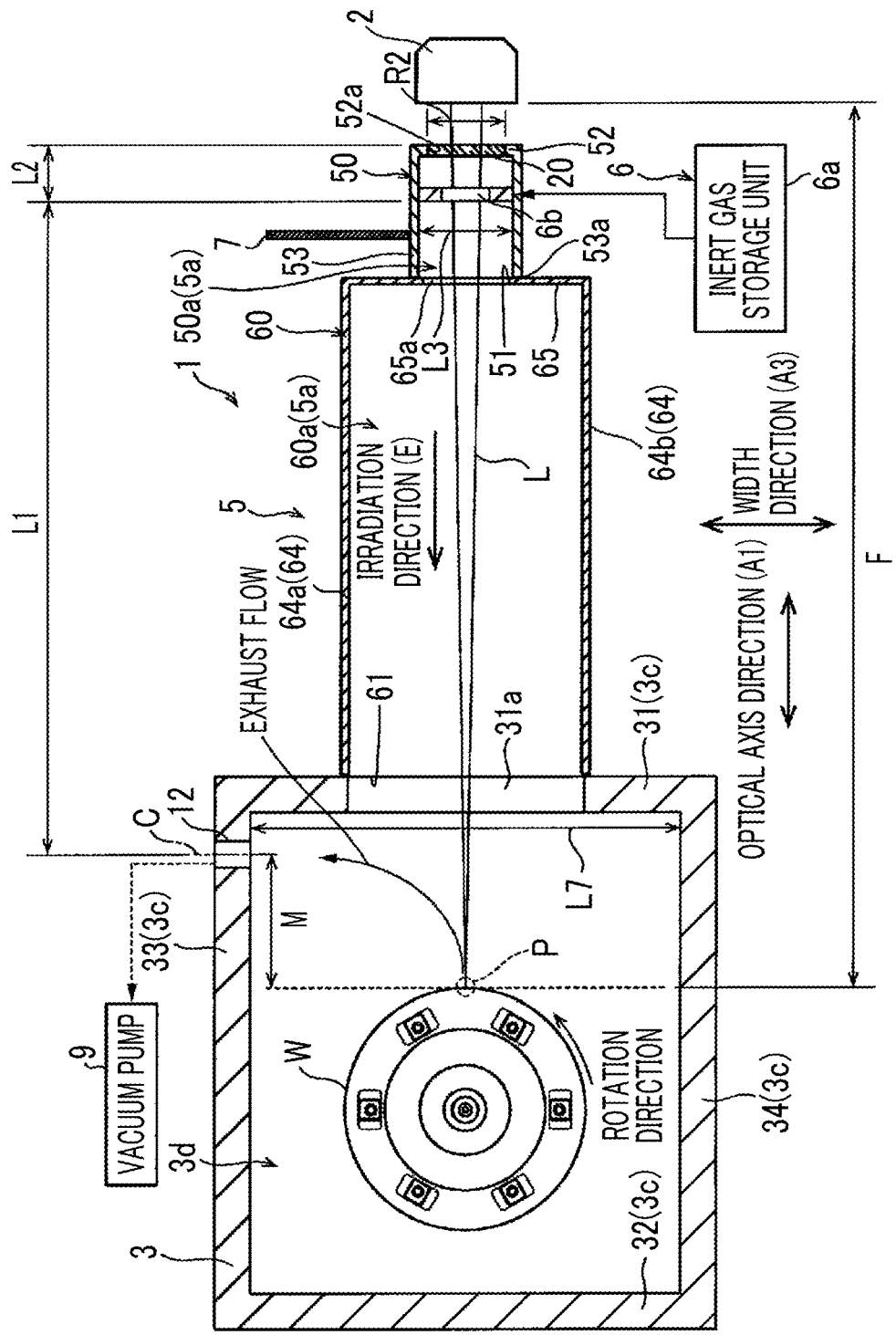
FIG. 2 is a schematic cross-sectional view illustrating a chamber and a tubular portion in the laser welding device according to the first embodiment.

As illustrated in FIGS. 1 and 2, the chamber 3 is configured to accommodate the workpiece W therein. Specifically, the chamber 3 includes an upper wall portion 3a, a lower wall portion 3b, a side wall portion 3c provided between the upper wall portion 3a and the lower wall portion 3b, and an internal space 3d surrounded by the upper wall portion 3a, the lower wall portion 3b, and the side wall portion 3c. The side wall portion 3c has a first side wall portion 31 in which an opening 31a through which the laser beam L passes is formed, and a second side wall portion 32 facing the first side wall portion 31 in the optical axis direction A1. Further, the side wall portion 3c has a third side wall portion 33 in which an exhaust port 12 connected to the vacuum pump 9 is formed, and a fourth side wall portion 34 facing the third side wall portion 33 in the width direction A3. Here, the chamber 3 is made of a metal such as aluminum.

Further, in the chamber 3, the internal space 3d is set to a low vacuum atmosphere (about 0.1 kPa) by adjusting an air pressure of the internal space 3d using the vacuum gauge 8 and the vacuum pump 9. That is, the chamber 3 has a low-pressure internal space 3d in which the workpiece W is disposed.

The leg portion 4 extends in the up-down direction A2 and supports the chamber 3 from below. In the leg portion 4, an upper end portion is attached to a lower end portion of the lower wall portion 3b, and a lower end portion is attached to a floor.

The tubular portion 5 allows the laser beam L from the laser beam irradiation unit 2 to transmit and communicates with the chamber 3. Specifically, the tubular portion 5 includes a first tubular portion 50 that is disposed on a side opposite to the irradiation direction E side and has a laser transmission window 20 through which the laser beam L can be transmitted, and a second tubular portion 60 that has a space 60a through which the laser beam L passes and is adjacent to the irradiation direction E side of the first tubular portion 50. Here, the first tubular portion 50 has a space 50a through which the laser beam L passes. The space 50a of the first tubular portion 50 communicates with the internal space 3d of the chamber 3 via the space 60a of the second tubular portion 60. The tubular portion 5 is formed with an internal space 5a in which the space 50a of the first tubular portion 50 and the space 60a of the second tubular portion 60 are combined.

As a result, the laser beam L from the laser beam irradiation unit 2 passes through the laser transmission window 20, the space 50a of the first tubular portion 50, the space 60a of the second tubular portion 60, and the internal space 3d of the chamber 3 in this order and reaches the workpiece W.

The inert gas supply unit 6 is configured to supply an inert gas (nitrogen, argon, carbon dioxide, helium, or the like) into the tubular portion 5. Specifically, the inert gas supply unit 6 includes an inert gas storage unit 6a that stores the inert gas and a gas injection nozzle 6b that injects the inert gas supplied from the inert gas storage unit 6a into the internal space 5a of the tubular portion 5.

The shutter 7 is configured to block the internal space 5a on an exit side in the optical axis direction A1 from the laser transmission window 20. Specifically, the shutter 7 moves in the width direction A3, and thus, can switch communication or cutoff between a space from the laser transmission window 20 of the first tubular portion to the shutter 7 and the internal space 3d of the chamber 3. The shutter 7 is disposed in the first tubular portion 50.

As the vacuum gauge 8, a known vacuum gauge such as an ionization vacuum gauge is used. As the vacuum pump 9, a known vacuum pump such as a rotary type vacuum pump is used. The vacuum pump 9 is configured to exhaust air in the chamber 3 to form a low pressure of the internal space 3d of the chamber 3.

The support portion 10 is configured to rotatably support the workpiece W around a rotation axis R along the up-down direction A2. The support portion 10 is connected to the rotation drive mechanism 11. Accordingly, the support portion 10 is rotated around the rotation axis R by drive of the rotation drive mechanism 11. Further, since the workpiece W is attached to the support portion 10, the workpiece W rotates as the support portion 10 rotates around the rotation axis R.

The rotation drive mechanism 11 is configured to rotate the support portion 10 around the rotation axis R. Specifically, the rotation drive mechanism 11 includes a motor 11a, a belt 11b having one end portion hung on the motor 11a and the other end portion hung on the support portion 10, and a bearing 11c supporting the support portion 10.

<First Tubular Portion>

Figure 3:
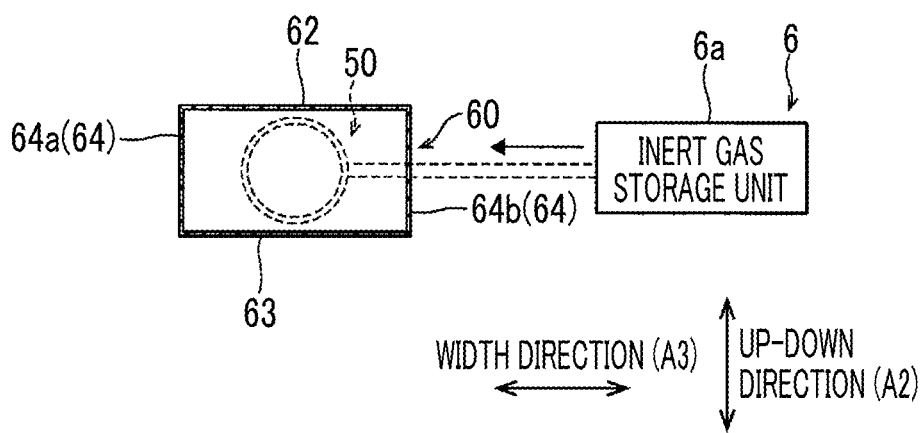
FIG. 3 is a schematic cross-sectional view illustrating a cross-sectional shape of a second tubular portion in the laser welding device according to the first embodiment.

As illustrated in FIGS. 2 and 3, the above-described first tubular portion 50 has a cylindrical shape including an opening 51 at an end portion 53a on the exit side in the optical axis direction A1. That is, a cross-sectional shape of the first tubular portion 50 orthogonal to the optical axis direction A1 has a circular shape. Here, the first tubular portion 50 is formed in a circular shape when viewed from the optical axis direction A1, and includes an end surface portion 52 provided on an incident side in the optical axis direction A1 and a side peripheral surface portion 53 protruding from a peripheral edge portion of the end surface portion 52 to the exit side in the optical axis direction A1. The end surface portion 52 of the first tubular portion 50 has an opening 52a into which the laser transmission window 20 is fitted.

(Second Tubular Portion)

Further, the above-described second tubular portion 60 has a square tubular shape having an opening 61 at an end portion on the exit side in the optical axis direction A1. That is, a cross-sectional shape of the second tubular portion 60 orthogonal to the optical axis direction A1 has a rectangular shape. The second tubular portion 60 includes an upper surface portion 62, a lower surface portion 63, and a side surface portion 64 provided between the upper surface portion 62 and the lower surface portion 63. The side surface portion 64 of the second tubular portion 60 includes an end surface portion 65 provided on the incident side in the optical axis direction A1, a first side surface portion 64a provided on the exhaust port 12 side in the width direction A3, and a second side surface portion 64b facing the first side surface portion 64a in the width direction A3. The end surface portion 65 of the second tubular portion 60 has a communication port 65a which communicates the space 50a of the first tubular portion 50 and the space 60a of the second tubular portion 60. Moreover, a length of the second tubular portion 60 in the irradiation direction E is longer than a length of the first tubular portion 50 in the irradiation direction E.

(Exhaust Port)

The above-described exhaust port 12 is connected to the vacuum pump 9. Further, the exhaust port 12 is formed in the third side wall portion 33 of the chamber 3.

(Inert Gas Supply Unit)

Hereinafter, the above-described inert gas supply unit 6 will be described in more detail.

Figure 4:
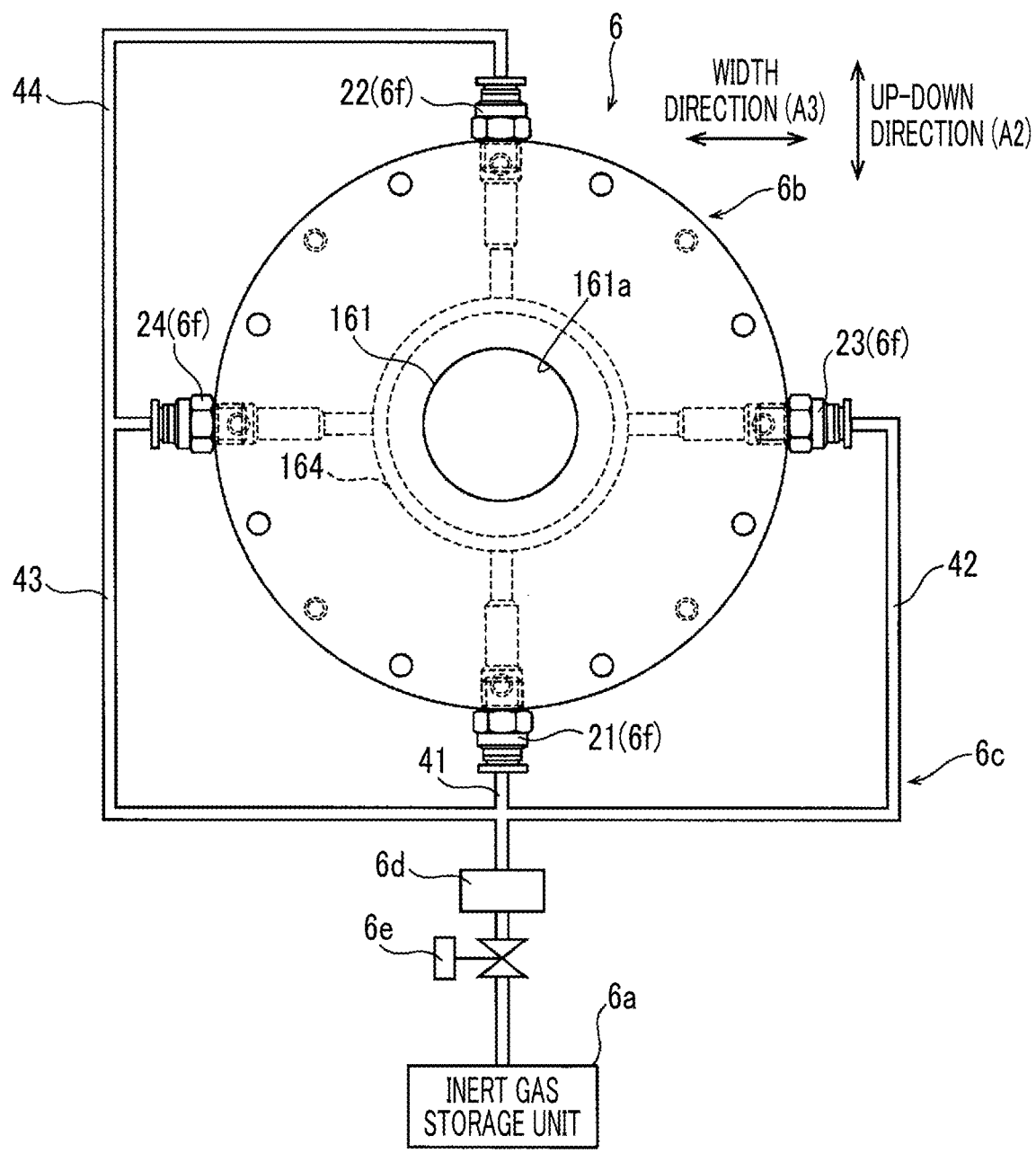
FIG. 4 is a schematic view illustrating an inert gas supply unit in the laser welding device according to the first embodiment.

As illustrated in FIG. 4, the inert gas supply unit 6 includes the above-described inert gas storage unit 6a, the above-described gas injection nozzle 6b, an inert gas supply pipe 6c, a flow meter 6d, a flow control valve 6e, and an inert gas introduction unit 6f.

The inert gas supply pipe 6c connects the inert gas storage unit 6a and the inert gas introduction unit 6f. The inert gas supply pipe 6c supplies the inert gas as a shield gas from the inert gas storage unit 6a to the inert gas introduction unit 6f. The flow meter 6d measures a flow rate of the inert gas flowing through the inert gas supply pipe 6c. The flow control valve 6e adjusts the flow rate of the inert gas flowing through the inert gas supply pipe 6c by opening or closing the valve based on a measured value of the flow meter 6d. The inert gas introduction unit 6f connects the inert gas supply pipe 6c and the gas injection nozzle 6b. The inert gas introduction unit 6f introduces the inert gas from the inert gas supply pipe 6c into the gas injection nozzle 6b. The inert gas introduction unit 6f causes the inert gas to flow to the gas injection nozzle 6b along an inner direction in a radial direction of the gas injection nozzle 6b.

A plurality of the inert gas introduction units 6f are disposed at substantially equal angular intervals on an outer peripheral portion of the gas injection nozzle 6b. Specifically, the plurality of (four) the inert gas introduction units 6f are disposed at intervals of approximately 90°. Here, the plurality of inert gas introduction units 6f includes a first introduction unit which is disposed on a downward side in the up-down direction A2 and causes the inert gas to flow upward and a second introduction unit 22 which is disposed on an upward side in the up-down direction A2 and causes the inert gas to flow downward. The plurality of inert gas introduction units 6f includes a third introduction unit 23 which is disposed on one direction side in the width direction A3 and causes the inert gas to flow toward the other direction side, and a fourth introduction unit 24 which is disposed on the other direction side in the width direction A3 and causes the inert gas to flow toward one direction side.

The inert gas supply pipe 6c has a first supply unit that connects the inert gas storage unit 6a and the first introduction unit 21, a second supply unit 42 that branches off from the first supply unit 41 and is connected to the third introduction unit 23, and a third supply unit 43 that branches off from the first supply unit 41 and is connected to the fourth introduction unit 24. Further, the inert gas supply unit 6 has a fourth supply unit 44 that branches off from the third supply unit 43 and is connected to the second introduction unit 22.

<Gas Injection Nozzle>

Hereinafter, the above-described gas injection nozzle 6b will be described in more detail.

As illustrated in FIG. 2, the gas injection nozzle 6b is configured to prevent the metal vapor ejected from the processing point P of the workpiece W to the laser transmission window 20 from adhering to the laser transmission window 20. Specifically, the gas injection nozzle 6b is disposed on the chamber 3 side of the first tubular portion 50 from the laser transmission window 20. That is, the gas injection nozzle 6b is disposed at a position at which the inert gas can be injected to the position of the irradiation direction E side of the first tubular unit 50 from the laser transmission window 20.

Further, the gas injection nozzle 6b is configured to form a gas shield by the inert gas at the position of the irradiation direction E side of the first tubular portion 50 from the laser transmission window 20. Specifically, a distance L1 from the gas injection nozzle 6b to the exhaust port 12 is longer than a distance L2 from the gas injection nozzle 6b to the laser transmission window 20. That is, the gas injection nozzle 6b is disposed at a position at which it is possible to prevent the shielding property of the gas shield formed by the inert gas injected from an injection unit 162 from decreasing due to the exhaust of the vacuum pump 9.

Figure 5:
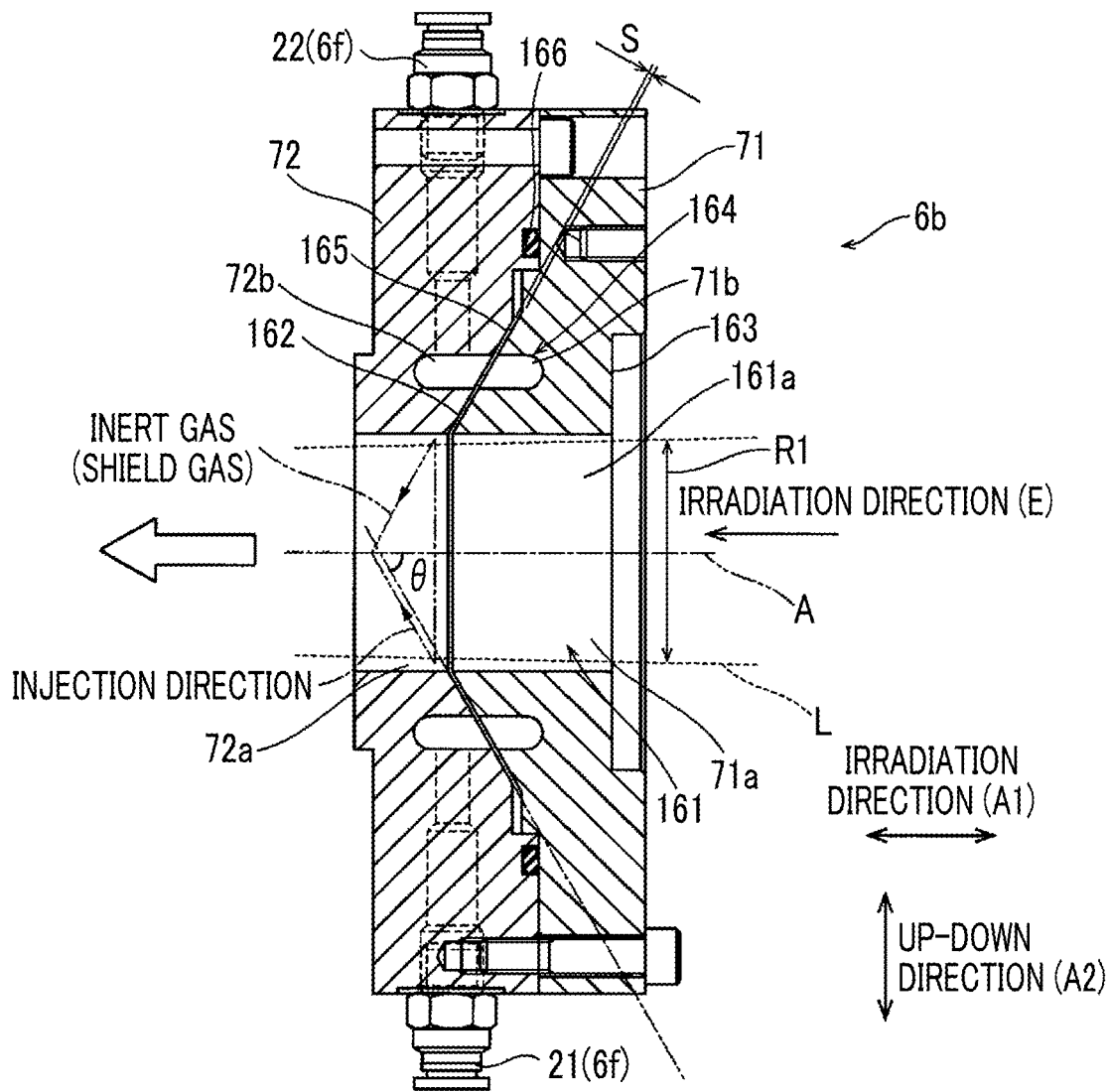
FIG. 5 is a cross-sectional view illustrating a gas injection nozzle in the laser welding device according to the first embodiment.

As illustrated in FIGS. 4 and 5, the gas injection nozzle 6b of the first embodiment has an optical path hole 161 through which the laser beam L passes, and the injection unit 162 which injects the inert gas into the optical path hole 161 toward the irradiation direction E side and the optical axis A side of the laser beam L. Further, the gas injection nozzle 6b includes a recess 163 provided on the side opposite to the irradiation direction E side of the optical path hole 161. The inert gas is a shield gas for shielding the metal vapor ejected from the workpiece W to the laser transmission window 20 side (refer to FIG. 2) when the workpiece W is welded by the laser beam L.

The optical path hole 161 is formed in a circular shape when viewed from the irradiation direction E side. The optical path hole 161 is disposed at a central portion of the gas injection nozzle 6b when viewed from the irradiation direction E side. The optical path hole 161 passes through the gas injection nozzle 6b along the irradiation direction E. The optical path hole 161 has a constant cross-sectional shape which is orthogonal to the irradiation direction E along the irradiation direction E, as a whole. That is, the cross-sectional shape of the optical path hole 161 orthogonal to the irradiation direction E is a circular shape that is equal to or larger than a spot diameter R1 of the laser beam L and smaller than a diameter R2 (refer to FIG. 2) of the laser transmission window 20 at the disposition position of the gas injection nozzle 6b.

The recess 163 is formed in a circular shape when viewed from the side opposite to the irradiation direction E side. The recess 163 is disposed at the central portion of the gas injection nozzle 6b when viewed from the side opposite to the irradiation direction E side. The recess 163 has a circular shape larger than that of the optical path hole 161 when viewed from the side opposite to the irradiation direction E side. The recess 163 communicates with the optical path hole 161.

As illustrated in FIG. 5, the injection unit 162 is configured to inject the inert gas in a direction inclined at a predetermined angle θ with respect to the optical axis A of the laser beam L toward the irradiation direction E side and the optical axis A side of the laser beam L.

Specifically, the injection unit 162 is inclined at substantially the same angle as the predetermined angle θ. That is, the injection unit 162 is formed in a slit shape extending in a direction inclined at the predetermined angle θ with respect to the optical axis A of the laser beam L. Here, preferably, the predetermined angle θ is about 30° or more and less than about 90° with respect to the optical axis A of the laser beam L. Further, more preferably, the predetermined angle θ is about 30° or more and about 60° or less with respect to the optical axis A of the laser beam L.

Further, the injection unit 162 is configured to increase a flow velocity of the introduced inert gas. Specifically, the injection unit 162 having a slit shape has a minute slit width S. The slit width S is preferably about 0.3 mm or more and about 0.7 mm or less. Further, the slit width S is more preferably about 0.5 mm. A diameter of the optical path hole 161 is about 32 mm.

In this way, in the gas injection nozzle 6b, the inert gas introduced from the inert gas introduction unit 6f is rectified by the injection unit 162 at a predetermined angle θ and a predetermined flow velocity.

The injection unit 162 is configured to stabilize the shielding property of the gas shield formed by the inert gas injected into the optical path hole 161. Specifically, the injection unit 162 is provided in a circumferential shape along an inner peripheral surface 161a of the optical path hole 161. That is, the injection unit 162 is formed in a circumferential slit shape. Here, the injection unit 162 having a slit shape is inclined at substantially the same angle as the predetermined angle θ, as a whole. As a result, the inert gas injected by the injection unit 162 forms a substantially conical gas shield. As described above, the gas shield formed by the inert gas injected into the optical path hole 161 by the injection unit 162 covers the optical path hole 161.

As illustrated in FIGS. 4 and 5, the gas injection nozzle 6b includes a buffer space 164 which is provided in a circumferential shape on an outside of the circumferential injection unit 162 and through which the inert gas introduced from the inert gas introduction unit 6f flows. That is, the buffer space 164 is filled with the inert gas introduced from the inert gas introduction unit 6f. The buffer space 164 is configured to stabilize the flow rate of the inert gas injected from the injection unit 162 and to stabilize the shielding property of the gas shield formed by the inert gas injected from the injection unit 162.

As a result, in the gas injection nozzle 6b, the flow rate of the inert gas injected from the injection unit 162 becomes a predetermined flow rate. That is, the predetermined flow rate is preferably about 4 [L/min] or more and about 10 [L/min] or less. Further, the predetermined flow rate is more preferably about 4 [L/min] or more and about 6 [L/min] or less.

The gas injection nozzle 6b is separately provided as a first nozzle member 71 and a second nozzle member 72. The first nozzle member 71 is disposed on the irradiation direction E side. The second nozzle member 72 is adjacent to the side opposite to the irradiation direction E side of the first nozzle member 71. The above-described optical path hole 161 is formed by combining a first optical path hole 71a formed in the first nozzle member 71 and a second optical path hole 72a formed in the second nozzle member 72. The above-described injection unit 162 having a slit shape is formed by a gap at a boundary portion between the first nozzle member 71 and the second nozzle member 72. The above-described buffer space 164 described above is formed by combining a first buffer space 71b formed in the first nozzle member 71 and a second buffer space 72b formed in the second nozzle member 72.

The gas injection nozzle 6b has a sealing material 166 that seals a gap 165 formed by attaching the first nozzle member 71 to the second nozzle member 72. The gap 165 extends in a direction along an extending direction of the injection unit 162 having a slit shape. The sealing material 166 is an O-ring formed of an elastic material. The sealing material 166 is disposed outside the buffer space 164 in a radial direction of the gas injection nozzle 6b. Accordingly, in the gas injection nozzle 6b, it is possible to prevent the inert gas from passing through the gap 165 and leaking.

The gas injection nozzle 6b having the configuration is made of a metal such as aluminum.

Effect of First Embodiment

In the first embodiment, the following effects can be obtained.

In the first embodiment, as described above, the gas injection nozzle 6b includes the optical path hole 161 through which the laser beam L passes, and the injection unit 162 that injects the inert gas for shielding metal vapor, which is ejected from the workpiece W to the laser transmission window 20 side when the workpiece W is welded by the laser beam L, into the optical path hole 161 toward the irradiation direction E side and the optical axis A side of the laser beam L. As a result, when the workpiece W is welded, by applying an inert gas injected from the injection unit 162 toward the irradiation direction E side and the optical axis A side of the laser beam L to the metal vapor directed from the workpiece W to the laser transmission window 20, unlike when only filling with the inert gas, the metal vapor from the workpiece W toward the laser transmission window 20 can be effectively prevented. Further, as compared with a case where the inert gas is injected in a direction substantially perpendicular to the optical axis A of the laser beam L, it is possible to increase a force for pushing back the metal vapor from the workpiece W toward the laser transmission window 20. As a result, it is possible to effectively prevent metal vapor from adhering to the laser transmission window 20 when the workpiece W is welded. Further, by causing the laser beam L to pass through the optical path hole 161, it is possible to prevent the metal vapor from adhering to the laser transmission window 20 when the workpiece W is welded without interfering with the irradiation of the laser beam L.

Further, in the first embodiment, as described above, the injection unit 162 is configured to inject the inert gas in the direction inclined at a predetermined angle θ with respect to the optical axis A of the laser beam L toward the irradiation direction E side and the optical axis A side of the laser beam L. Accordingly, unlike a case where the inert gas is injected in a direction substantially parallel to the optical axis A of the laser beam L, the gas shield covering the optical path hole 161 can be formed more reliably. As a result, the metal vapor from the workpiece W toward the laser transmission window 20 can be effectively prevented, and thus, it is possible to more effectively prevent the metal vapor from adhering to the laser transmission window 20 when the workpiece W is welded.

Further, in the first embodiment, as described above, the injection unit 162 is provided in a circumferential shape along the inner peripheral surface 161a of the optical path hole 161. Accordingly, the inert gas can be injected from the injection unit 162 into the optical path hole 161 in a well-balanced manner (uniformly), and thus, a uniform gas shield can be formed in the optical path hole 161. As a result, the shielding property of the inert gas with respect to the metal vapor can be stabilized.

Further, in the first embodiment, as described above, the injection unit 162 is formed in a circumferential slit shape. Accordingly, unlike a case where the injection unit 162 is provided by forming a plurality of holes, the inert gas can be injected from the injection unit 162 into the optical path hole 161 without a gap, and thus, a more uniform gas shield can be formed in the optical path hole 161. As a result, the shielding property of the inert gas with respect to the metal vapor can be further stabilized.

Further, in the first embodiment, as described above, the injection unit 162 having a slit shape is inclined at the angle substantially the same as the predetermined angle θ as a whole. As a result, unlike a case where only the tip portion of the injection unit 162 is inclined at substantially the same angle as the predetermined angle θ and the inert gas is injected in the direction inclined by the predetermined angle θ, it is possible to prevent a pressure loss from increasing. That is, since the inert gas passing through the injection unit 162 can smoothly flow, it is possible to prevent the flow velocity of the inert gas injected from the injection unit 162 from decreasing. As a result, it is possible to prevent the force of the inert gas injected from the injection unit 162 from being weakened, and thus, the metal vapor from the workpiece W toward the laser transmission window 20 can be more effectively prevented.

Further, in the first embodiment, as described above, the gas injection nozzle 6b is provided with a buffer space 164 which is provided in a circumferential shape on an outside of the circumferential injection unit 162 and through which the inert gas introduced from the inert gas introduction unit 6f flows. Accordingly, the circumferential buffer space 164 can stabilize the flow rate of the inert gas injected from the injection unit 162, and thus, a more uniform gas shield can be formed in the optical path hole 161.

Further, in the first embodiment, as described above, the plurality of inert gas introduction units 6f are disposed on the outer peripheral portion of the gas injection nozzle 6b at substantially equal angular intervals. Accordingly, an amount of the inert gas retained in the buffer space 164 can be stabilized, and thus, a more uniform gas shield can be formed in the optical path hole 161.

Further, in the first embodiment, as described above, the optical path hole 161 has a constant cross-sectional shape that is orthogonal to the irradiation direction E along the irradiation direction E, as a whole. Accordingly, unlike a case where the optical path hole 161 does not have a constant cross-sectional shape orthogonal to the irradiation direction E along the irradiation direction E, the change in the flow velocity of the inert gas injected into the optical path hole 161 can be suppressed. Further, unlike a case where the flow velocity of the inert gas injected into the optical path hole 161 becomes high, the flow of the inert gas in the optical path hole 161 is less likely to become turbulent, and thus, a more uniform gas shield is formed in the optical path hole 161. As a result, the shielding property of the inert gas with respect to the metal vapor ejected from the workpiece W toward the laser transmission window 20 can be stabilized.

Further, in the first embodiment, as described above, the cross-sectional shape of the optical path hole 161 orthogonal to the irradiation direction E has a circular shape equal to or larger than the spot diameter R1 of the laser beam L at the disposition position of the gas injection nozzle 6b and smaller than the diameter R2 of the laser transmission window 20. Accordingly, it is possible to prevent the metal vapor ejected from the workpiece W toward the laser transmission window 20 from passing through the optical path hole 161 while allowing the laser beam L to pass through the optical path hole 161, and thus, it is possible to more effectively prevent the metal vapor from adhering to the laser transmission window 20 when the workpiece W is welded.

Further, in the first embodiment, as described above, the tubular portion 5 through which the laser beam L that has been transmitted through the laser transmission window passes and which communicates with the chamber 3 is provided. The laser transmission window 20 and the gas injection nozzle 6b are disposed in the tubular portion 5. Accordingly, the gas injection nozzle 6b can be disposed in the tubular portion 5 having an internal dimension that allows the laser beam L to pass through. Therefore, as compared with a case where the gas injection nozzle 6b is disposed in the chamber 3 having a relatively large volume in which the workpiece W is disposed, it is possible to prevent a size of the gas injection nozzle 6b from increasing.

Further, in the first embodiment, as described above, the length of the irradiation direction E of the second tubular portion 60 is made longer than the length of the irradiation direction E of the first tubular portion 50. The gas injection nozzle 6b is disposed on the chamber 3 side of the first tubular portion 50 from the laser transmission window 20. As a result, the inert gas is diffused in the second tubular portion 60, and the metal vapor can be blocked by the inert gas injected from the gas injection nozzle 6b. Therefore, it is possible to more reliably prevent the metal vapor from adhering to the transmission window 20 when the workpiece W is welded.

Further, in the first embodiment, as described above, the distance L1 from the gas injection nozzle 6b to the exhaust port 12 is longer than the distance L2 from the gas injection nozzle 6b to the laser transmission window 20. Accordingly, it is possible to prevent the inert gas injected from the injection unit 162 from being disturbed due to the negative pressure generated by the exhaust of the vacuum pump 9. As a result, it is possible to suppress a decrease in the shielding property of the gas shield formed by the inert gas injected from the injection unit 162.

Further, in the first embodiment, as described above, the slit width S of the injection unit 162 is set to an appropriate width (about 0.5 mm), and thus, it is possible to reduce the flow rate of the inert gas injected from the injection unit 162.

(Experimental Results of Welding of Workpieces Using Laser Welding Device)

Next, with reference to FIGS. 6 to 9, when the workpiece W is welded using the laser welding device 1 and a laser welding device 201 in which the configuration of the laser welding device 1 is changed, an example and a comparative example illustrating dirt of the laser transmission window 20 will be described.

EXAMPLE

The example will be described with reference to FIGS. 6 and 7. The example is the experimental result when the workpiece W is welded by using the above-described laser welding device 1.

Figure 6:
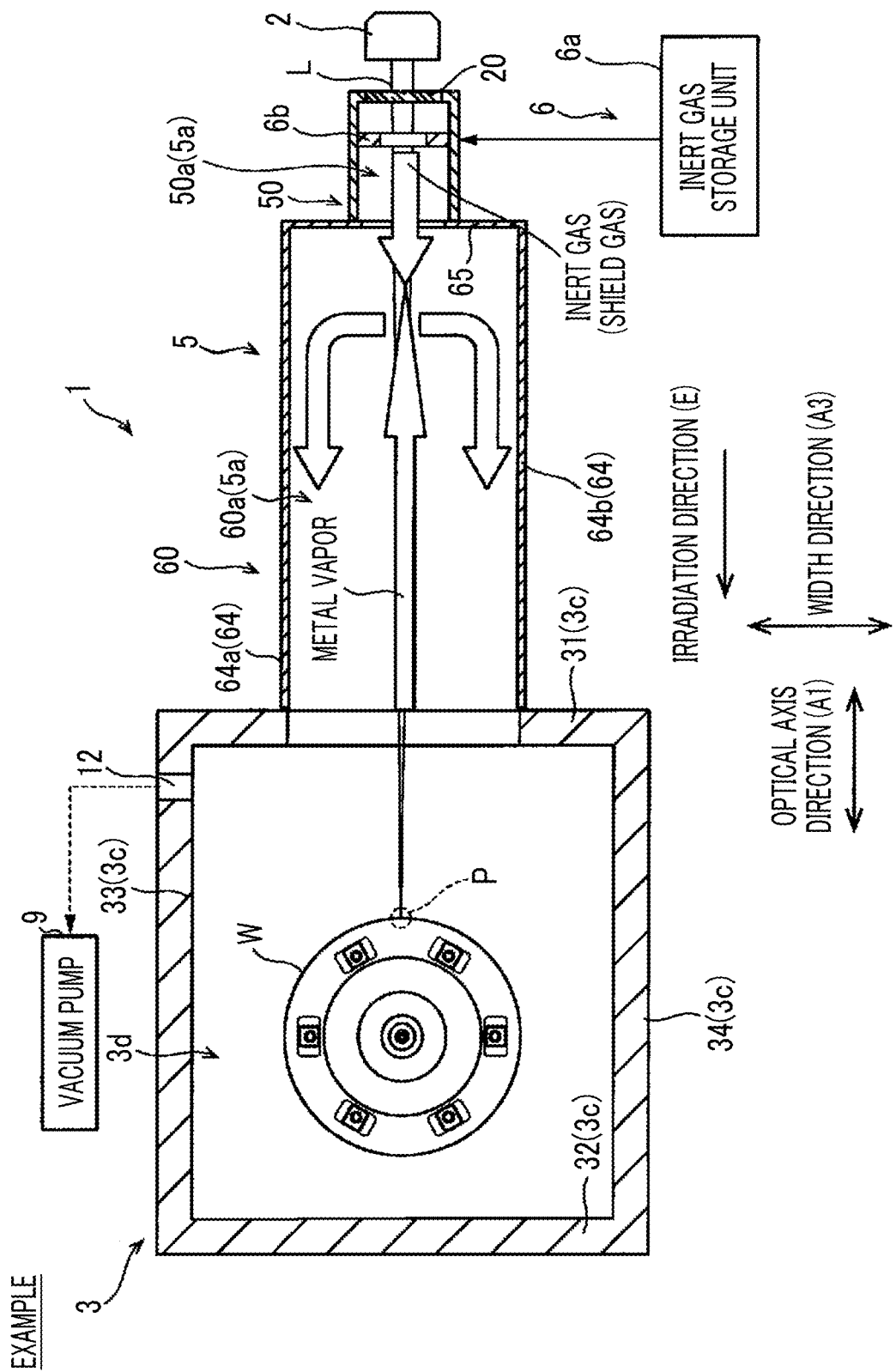
FIG. 6 is a cross-sectional view schematically illustrating a laser welding device used in an example.

As illustrated in FIG. 6, in the laser welding device 1, metal vapor ejected from the processing point P of the workpiece W is blocked by the inert gas (shield gas) injected from the gas injection nozzle 6b disposed in the first tubular portion 50.

In the example, the workpiece W (torque converter 100) was welded by the laser welding device 1 under the following conditions. The predetermined angle θ of the injection unit 162 is 60° with respect to the optical axis A of the laser beam L. The slit width S of the injection unit 162 is 0.5 mm. A predetermined flow rate of the inert gas injected from the injection unit 162 is 5 [L/min]. A pressure in the internal space 3d of the chamber 3 is 0.1 [kPa]. The output of the laser beam irradiation unit 2 is 4.0 [kW]. The focal length F of the laser beam irradiation unit 2 is 900 [mm]. The inert gas is nitrogen. The distance between the gas injection nozzle 6b and the laser transmission window 20 is 50 [mm].

Figure 7:
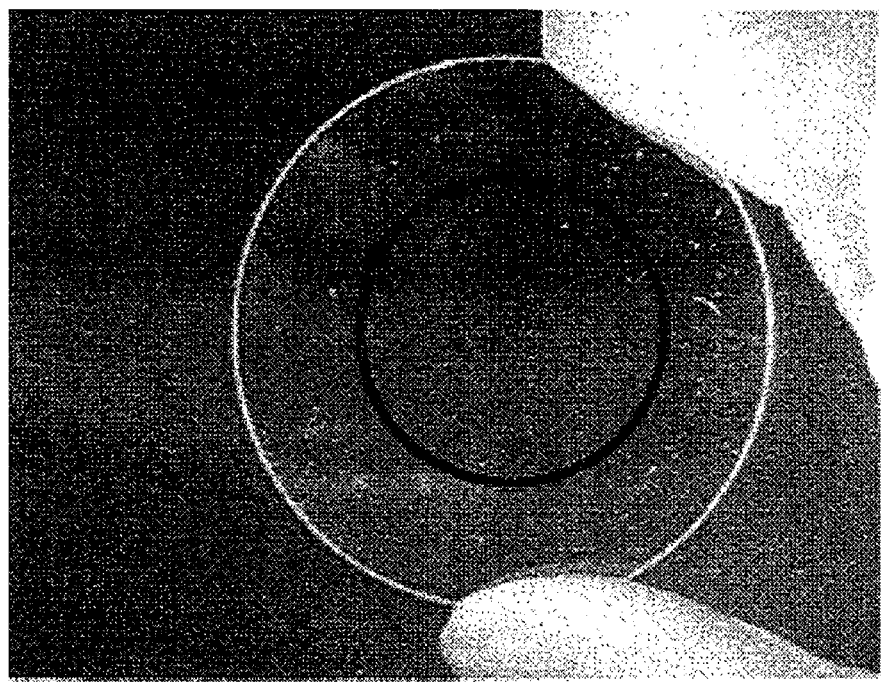
FIG. 7 is a view illustrating a laser transmission window after a workpiece is welded by the laser welding device used in the example.

As illustrated in FIG. 7, in the experimental results of the example, dirt due to the metal vapor did not adhere to the laser transmission window 20. As a result, it can be seen that the gas shield formed by the inert gas injected from the gas injection nozzle 6b in the tubular portion 5 effectively blocks the metal vapor ejected from the workpiece W.

Comparative Example

The comparative example will be described with reference to FIGS. 8 and 9. The comparative example is the experimental result when the workpiece W is welded by using the laser welding device 201 having the configuration different from that of the laser welding device 1 of the example.

Figure 8:
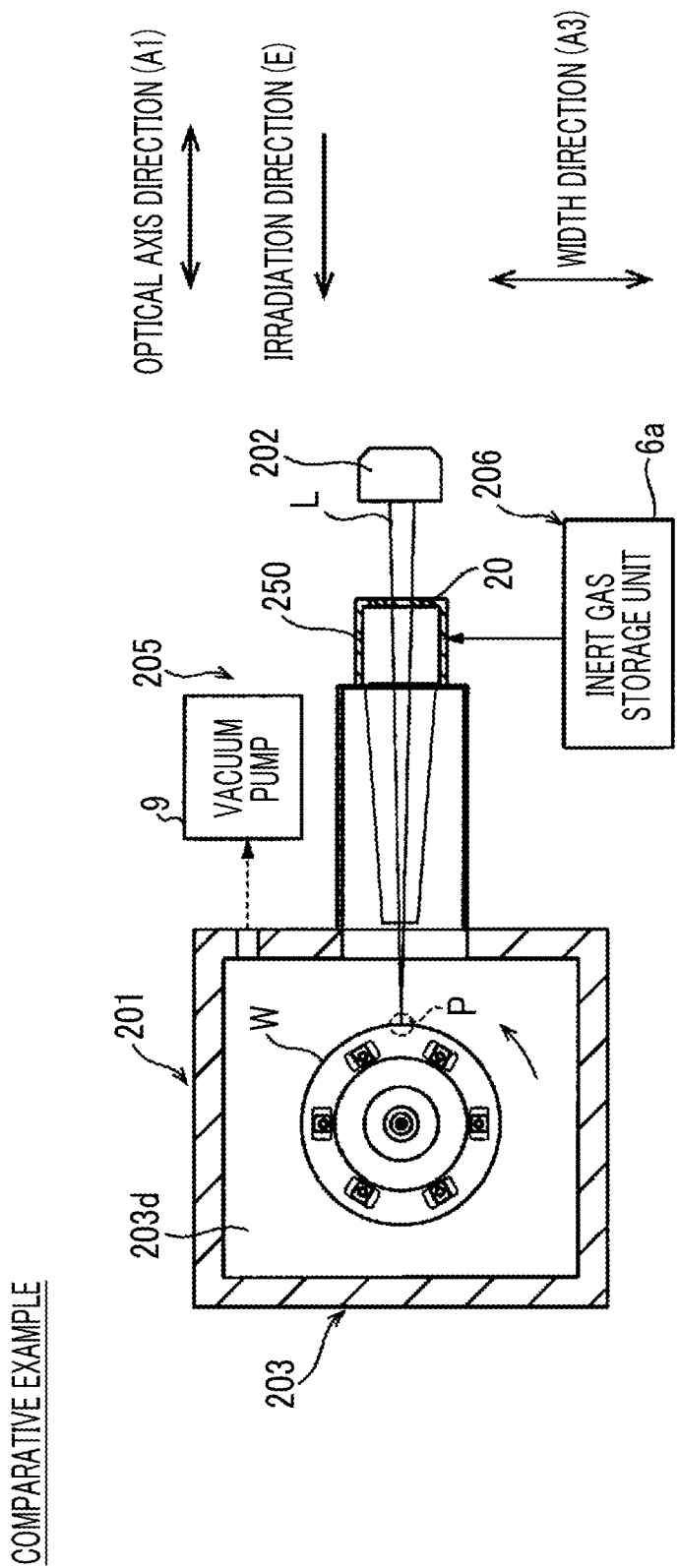
FIG. 8 is a cross-sectional view schematically illustrating a laser welding device used in a comparative example.

As illustrated in FIG. 8, in the laser welding device 201, by filling the first tubular portion 250 with the inert gas (shield gas) supplied from the inert gas storage unit 6a, the metal vapor ejected from the processing point P of the workpiece W is blocked.

In the comparative example, the workpiece W (torque converter 100) was welded by the laser welding device 201 under the following conditions. The flow rate of the inert gas supplied from the inert gas storage unit 6a is [L/min]. The pressure in the internal space 203d of the chamber 203 is 0.1 [kPa]. The output of the laser beam irradiation unit 202 is 4.0 [kW]. The focal length F of the laser beam irradiation unit 202 is 250 [mm]. The inert gas is nitrogen.

Figure 9:
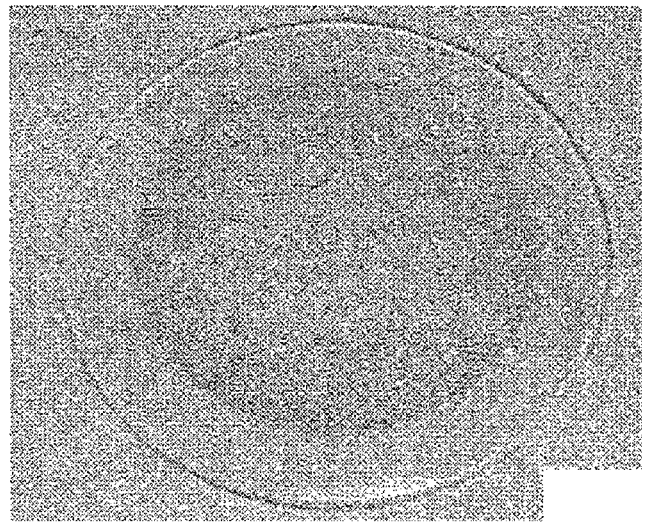
FIG. 9 is a diagram illustrating a laser transmission window after a workpiece is welded by the laser welding device used in the comparative example.

As illustrated in FIG. 9, in the experimental result of the comparative example, after the workpiece W is welded once by the laser beam irradiation unit 202, the dirt due to metal vapor adheres to the laser transmission window 20. As a result, it can be seen that the metal vapor ejected from the workpiece W is not effectively blocked only by filling the first tubular portion 250 with the inert gas supplied from the inert gas storage unit 6a.

Second Embodiment

Figure 10:
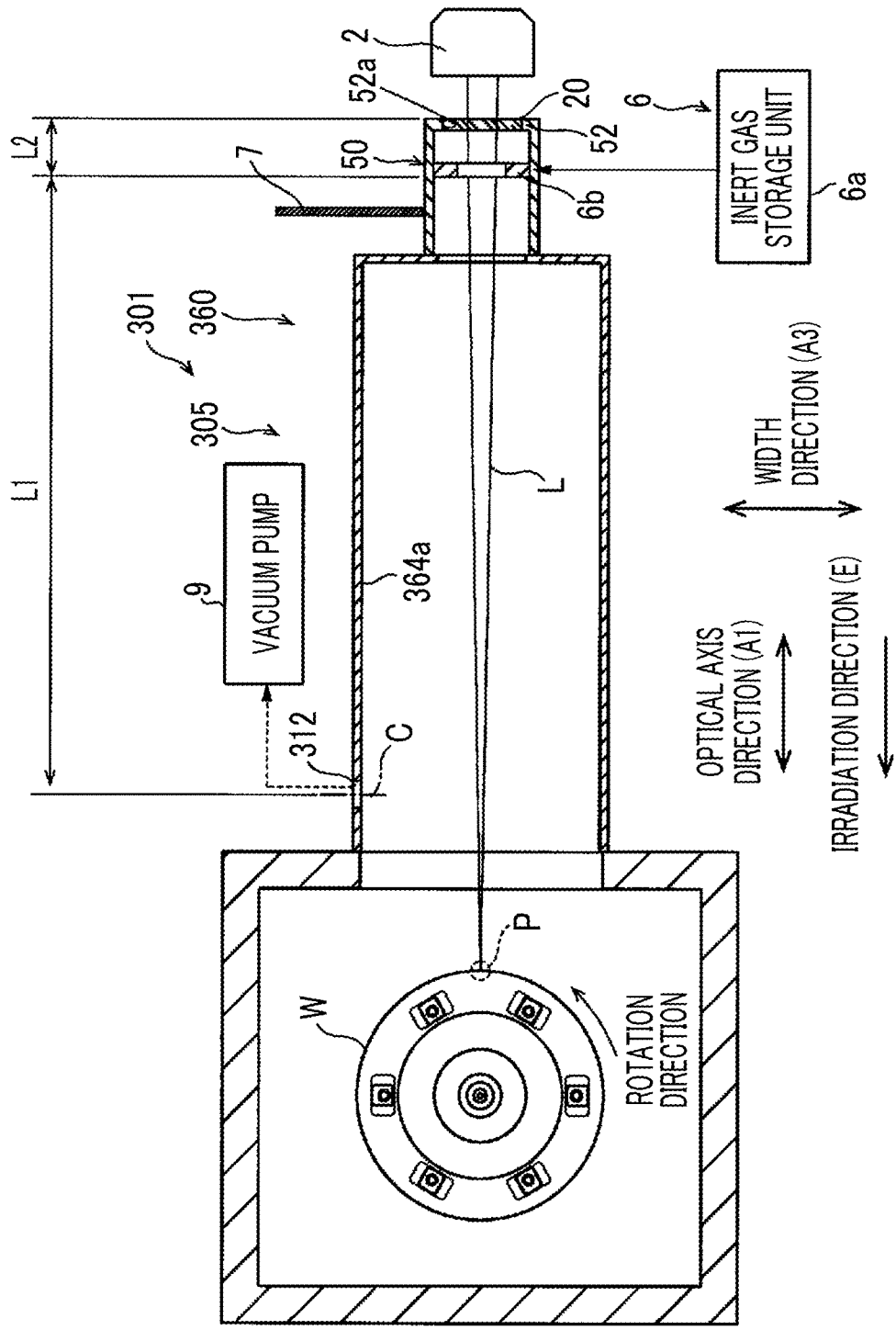
FIG. 10 is a schematic cross-sectional view illustrating a chamber and a tubular portion in a laser welding device according to a second embodiment.

Next, a configuration of a laser welding device 301 according to a second embodiment of the present invention will be described with reference to FIG. 10. In the laser welding device 301 of the second embodiment, unlike the laser welding device 1 of the first embodiment, an example in which an exhaust port 312 is disposed in the second tubular portion 360 will be described. The same configurations as those of the laser welding device 1 of the first embodiment are designated by the same reference numerals, and repeated descriptions thereof will be omitted.

(Exhaust Port)

The exhaust port 312 is connected to the vacuum pump 9 and is formed in a first side surface portion 364a of the second tubular portion 360.

(Gas Injection Nozzle)

The gas injection nozzle 6b is disposed on the chamber 3 side of the first tubular portion 50 from the laser transmission window 20. Further, the gas injection nozzle 6b is configured to form a gas shield by the inert gas at a position of the first tubular portion 50 on the irradiation direction E side of the laser transmission window 20. Specifically, the distance L1 from the gas injection nozzle 6b to the exhaust port 312 is longer than the distance L2 from the gas injection nozzle 6b to the laser transmission window 20. Since the other configurations of the second embodiment are the same as those of the first embodiment, descriptions thereof will be omitted.

Effect of Second Embodiment

In the second embodiment, the following effects can be obtained.

In the second embodiment, as in the first embodiment, when the workpiece W is welded, by applying the inert gas injected from the injection unit 162 toward the irradiation direction E side and the optical axis A side of the laser beam L to the metal vapor directed from the workpiece W to the laser transmission window 20, unlike when only filling the tubular portion 5 with the inert gas, the metal vapor from the workpiece W toward the laser transmission window 20 can be effectively prevented. Accordingly, it is possible to prevent metal vapor from adhering to the laser transmission window 20 when the workpiece W is welded.

In the second embodiment, as described above, by disposing the exhaust port 312 in the second tubular portion 60, it is possible to prevent the inert gas from flowing into the vicinity of the processing point P of the workpiece W as compared with a case where the exhaust port 312 is disposed in the chamber 3. As a result, a degree of vacuum at the processing point P can be stabilized, and thus, quality of a welded portion of the workpiece W can be improved. Other effects of the second embodiment are the same as those of the first embodiment.

Modification Example

It should be noted that the above-described embodiments are exemplary in all respects and are not considered to be restrictive. A scope of the present invention is illustrated by claims rather than the descriptions of the above-described embodiments, and further includes all modifications (modification examples) within the meaning and scope equivalent to the claims.

For example, in the first and second embodiments, the workpiece W is a torque converter 100, but the present invention is not limited to this. In the present invention, the workpiece may be a mechanical component other than the torque converter.

Further, in the first and second embodiments, the laser beam irradiation unit 2 is illustrated an example of having a long focal length (focal length F: about 900 [mm]), but the present invention is not limited to this. In the present invention, the laser beam irradiation unit may have a focal length exceeding about 900 [mm].

In the first and second embodiments, the gas injection nozzle 6b is disposed on the chamber 3 side of the first tubular portion 50 from the laser transmission window 20, but the present invention is not limited to this. In the present invention, the gas injection nozzle may be disposed in the second tubular portion as long as the distance from the gas injection nozzle to the exhaust port can be made longer than the distance from the gas injection nozzle to the laser transmission window.

In the first and second embodiments, the injection unit 162 is inclined at substantially the same angle as the predetermined angle θ, but the present invention is not limited to this. In the present invention, only the tip portion of the injection unit, not the entire injection unit, may be inclined at substantially the same angle as the predetermined angle.

In the first and second embodiments, for example, the injection unit 162 has a slit shape, but the present invention is not limited to this. In the present invention, the injection unit may be formed by a plurality of minute holes.

In the first and second embodiments, four inert gas introduction units 6f are disposed at intervals of approximately 90°, but the present invention is not limited to this. In the present invention, the number of the inert gas introduction units may be 1 to 3, or 5 or more. For example, two inert gas introduction units may be disposed at intervals of approximately 180°, and a disposition angle and the number of inert gas introduction units are not limited.

In the first and second embodiments, the optical path hole 161 is formed in a substantially circular shape when viewed from the irradiation direction E side, but the present invention is not limited to this. In the present invention, the optical path hole may have a polygonal shape such as a quadrangle when viewed from the irradiation direction side as long as the optical path hole does not interfere with the laser beam, and the shape of the optical path hole when viewed from the irradiation direction side is not limited.

REFERENCE SIGNS LIST 1, 201, 301: laser welding device
2, 202: laser beam irradiation unit
3, 203: chamber
3d, 203d: internal space
5: tubular portion
6b: gas injection nozzle
6f: inert gas introduction unit
9: vacuum pump (pump)
12, 312: exhaust port
20: laser transmission window
50: first tubular portion
60, 360: second tubular portion
161: optical path hole
162: Injection unit
164: buffer space
A: optical axis
θ: predetermined angle
E: irradiation direction
L: laser beam
L1, L2: distance
W: workpiece

The invention claimed is:

1. A laser welding device comprising:
a chamber that has a low-pressure internal space in which a workpiece is disposed;
a laser beam irradiation unit that irradiates the workpiece with a laser beam to weld the workpiece;
a laser transmission window through which the laser beam from the laser beam irradiation unit is transmitted; and a gas injection nozzle that is disposed on a workpiece side from the laser transmission window, wherein the gas injection nozzle includes an optical path hole through which the laser beam passes and an injector that injects an inert gas for shielding metal vapor, which is ejected from the workpiece to the laser transmission window side when the workpiece is welded by the laser beam, into the optical path hole toward an irradiation direction side and an optical axis side of the laser beam, and wherein the injector is provided in a circumferential shape along an inner peripheral surface of the optical path hole.

2. The laser welding device according to claim 1, wherein the injector is configured to inject the inert gas in a direction inclined at a predetermined angle with respect to an optical axis of the laser beam toward the irradiation direction side and the optical axis side of the laser beam.

3. The laser welding device according to claim 2, wherein the injector is formed in a circumferential slit shape.

4. The laser welding device according to claim 3, wherein the injector having a slit shape is inclined at substantially the same angle as the predetermined angle as a whole.

5. The laser welding device according to claim 3, further comprising:

an inert gas supplier for introducing the inert gas to the gas injection nozzle, wherein the gas injection nozzle further includes a buffer space which is provided in a circumferential shape on an outside of the injector and through which the inert gas introduced from the inert gas supplier flows.

6. The laser welding device according to claim 5, wherein a plurality of the inert gas suppliers are disposed on an outer peripheral portion of the gas injection nozzle at substantially equal angular intervals.

7. The laser welding device according to claim 1, wherein the optical path hole has a constant cross-sectional shape that is orthogonal to the irradiation direction along the irradiation direction, as a whole.

8. The laser welding device according to claim 1, wherein a cross-sectional shape of the optical path hole orthogonal to the irradiation direction has a circular shape equal to or larger than a spot diameter of the laser beam at a disposition position of the gas injection nozzle and smaller than a diameter of the laser transmission window.

9. The laser welding device according to claim 1, further comprising:

a tubular portion through which the laser beam that has been transmitted through the laser transmission window passes and which communicates with the chamber, wherein the laser transmission window and the gas injection nozzle are disposed in the tubular portion.

10. The laser welding device according to claim 9, wherein the tubular portion has a first tubular portion in which the laser transmission window is disposed and a second tubular portion which has a space through which the laser beam passes and is adjacent to the irradiation direction side of the first tubular portion, a length of the second tubular portion in the irradiation direction is longer than a length of the first tubular portion in the irradiation direction, and the gas injection nozzle is disposed on the chamber side of the first tubular portion from the laser transmission window.

11. The laser welding device according to claim 10, further comprising:

a pump which exhausts air in the chamber to form a low pressure in the internal space of the chamber, wherein the chamber includes an exhaust port connected to the pump, and a distance from the gas injection nozzle to the exhaust port is longer than a distance from the gas injection nozzle to the laser transmission window.

12. A laser welding device comprising:

a chamber that has a low-pressure internal space in which a workpiece is disposed;

a laser beam irradiation unit that irradiates the workpiece with a laser beam to weld the workpiece;

a laser transmission window through which the laser beam from the laser beam irradiation unit is transmitted;

a gas injection nozzle that is disposed on a workpiece side from the laser transmission window; and an inert gas supplier for introducing an inert gas to the gas injection nozzle, wherein the gas injection nozzle includes an optical path hole through which the laser beam passes and an injector that injects the inert gas for shielding metal vapor, which is ejected from the workpiece to the laser transmission window side when the workpiece is welded by the laser beam, into the optical path hole toward an irradiation direction side and an optical axis side of the laser beam, and wherein the gas injection nozzle further includes a buffer space which is provided in a circumferential shape on an outside of the injector and through which the inert gas introduced from the inert gas supplier flows.

* * * * *